United States Patent Office 2,838,540
Patented June 10, 1958

2,838,540

6-FLUORO-11-OXYGENATED STEROIDS

J Allan Campbell, Kalamazoo Township, Kalamazoo County, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,507

20 Claims. (Cl. 260—397.45)

The present invention relates to steroid compounds and is more particularly concerned with 6-fluoro-11β,21-dihydroxy-4-pregnene-3,20-dione (6-fluorocorticosterone) and 6-fluoro-21-hydroxy-4-pregnene-3,11,20-trione (6-fluoro-11-dehydrocorticosterone) the 21-acylates thereof, and intermediates in the production thereof.

It is an object of the instant invention to provide the 6-fluoro analogues of corticosterone and 11-dehydrocorticosterone and the 21-esters of these compounds. It is another object to provide a process for the production of 6-fluoro analogues of corticosterone, 11-dehydrocorticosterone, and the esters thereof. Another object is to provide the intermediates, 3,20-diketals of 11-oxygenated-5,6-oxido-21-hydroxy-6β-fluoroallopregnene-3,20-diones and 11-oxygenated-5α,21-dihydroxy-6β-fluoroallopregnene-3,20-diones. Other objects of this invention will be apparent to those skilled in the art to which this invention pertains.

The new compounds, 6-fluorocorticosterone, 6-fluoro-11-dehydrocorticosterone, and the 21-esters thereof possess valuable anti-rheumatoid arthritic, anti-inflammatory and glucocorticoid activity. They have the additional advantage of having a favorable body electrolyte balance and in addition have anti-phlogistic activity which makes them valuable for oral and parenteral as well as topical use. For example, 6α-fluoro-11-dehydrocorticosterone 21-acetate has been found to exhibit about 2.7 times the glucocorticoid activity of hydrocortisone. In addition, these compounds are useful as intermediates for the preparation of 6-fluorohydrocortisone and 6-fluorocortisone which are potent adrenocortical hormones having high glucocorticoid and anti-inflammatory activity. Such conversion can be conveniently accomplished for example, by microbiologically hydroxylating at the 17-position of the molecule, for example, with *Cephalothecium roseum*, A. T. C. C. 8685, using conditions known for the biooxidation of steroid compounds.

In general, the compounds of the present invention can be prepared for animal or human use by incorporating them in any one of several dosage forms suitable for such use. Such a dosage form includes the active ingredients plus a non-toxic carrier which can be either a solid material or a liquid. Bland carriers are of course preferred for oral use, and examples of oral dosage forms are tablets, capsules, liquid suspensions or solutions. For the dosage forms which are particularly suitable for parenteral administration, a sterile diluent is, of course, necessary. When the active ingredients are to be used topically they can be incorporated in an ointment, a bougie, a lotion or a jelly. When the intended use is the eye or ear, the compounds can be prepared in the form of drops or an ointment. The compounds may also be prepared in an aerosol vehicle when the intended use is nasal.

The compounds and process of the present invention are illustratively represented by the following formulae:

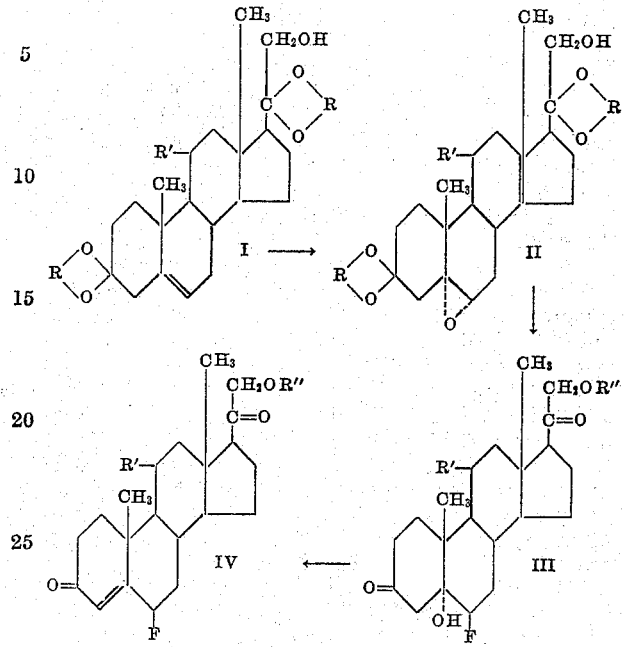

wherein R is an alkylene radical containing not more than eight carbon atoms, and the attaching oxygen to carbon bonds are separated by a chain of at least two and not more than three carbon atoms, R' is selected from the group consisting of hydroxy and keto, and R" is hydrogen or the acyl radical of an organic carboxylic acid, preferably an aliphatic hydrocarbon carboxylic acid containing from one to twelve carbon atoms, inclusive.

The process of the present invention comprises: epoxidizing an 11-oxygenated-21-hydroxy-4-pregnene-3,20-dione 3,20-bis (alkylene ketal) with a peracid, preferably peracetic acid; treating the thus produced 11-oxygenated-5α,6α-oxido-21-hydroxyallopregnane-3,20-dione 3,20-bis-(alkylene ketal) (II) with a fluorinating agent, preferably hydrofluoric acid, to give the corresponding 11-oxygenated-5α,21-dihydroxy-6β-fluoroallopregnane - 3,20-dione (III), and dehydrating the thus obtained 11-oxygenated-5α,21-dihydroxy-6β-fluoroallopregnane - 3,20-dione (III) either before or after acylation of the 21-hydroxyl, with a base or an acid to obtain 11-oxygenated 6-fluoro-21-hydroxy-4-pregnene-3,20-dione or 21-esters thereof (IV). Large amounts of base or acid produce the 6α-epimer, 11-oxygenated-6α-fluoro-21-hydroxy-4-pregnene-3,20-dione or 21-esters thereof; smaller amounts of acid or base, so that the reaction mixture is near neutral, results in the 6β-epimer, 11-oxygenated-6β-fluoro-21-hydroxy-4-pregnene - 3,20 - dione or 21 - esters thereof, which can be converted with acid or base by an additional step to the α-epimer.

The starting material for the instant invention, an 11-oxygenated-21-hydroxy-4-pregnene - 3,20 - dione 3,20-bis-(alkylene ketal), is prepared as disclosed in U. S. Patent 2,802,841 and as described in Examples 1 and 2 herein.

In carrying out the epoxidation step of the process of the present invention, a 3,20-bis-(alkylene ketal) of an 11-oxygenated-21-hydroxy-4-pregnene-3,20-dione steriod represented by Formula I, preferably the 3,20-bis-(ethylene ketal), is epoxidized with a peracid, e. g., peracetic, perbenzoic, perphthalic, or other known epoxidizing agents to produce the corresponding 5α,6α-oxide (II). A mixture of both the alpha and beta oxides is produced in this reaction. They can be separated by chromatographic or crystallization techniques well known in the art. The reaction is ordinarily performed by dissolving the desired 3,20-bis-(alkylene ketal) in an organic solvent and admixing with a solution of an epoxidizing agent. Suitable solvents are benzene, chloroform, methylene chloride, carbon tetrachloride, toluene, ether, and the like, with benzene and chloroform being preferred. The preferred temperature range for the epoxidation reaction is between zero and thirty degrees centigrade, but a temperature range of minus ten to plus sixty degrees centigrade is operative. The time of reaction may vary between one hour and 96 hours, or even longer. If desired, the course of the reaction may be followed by iodometric titration of aliquot samples withdrawn from the reaction mixture. After the reaction is complete, the product is obtained from the reaction mixture by conventional procedure, for example, by washing the reaction mixture and evaporating to dryness. The crude product can be purified by conventional methods such as chromatography or crystallization.

In the epoxide opening step of the present invention, a 3,20-bis-ketalized $5\alpha,6\alpha$-oxido-11-oxygenated-21-hydroxyallopregnane-3,20-dione (II), preferably the 3,20-bis-(ethylene ketal), is reacted with a fluorinating agent such as aqueous hydrogen fluoride to open the oxide and produce the corresponding $5\alpha,21$-dihydroxy-$6\beta$-fluoro-11-oxygenatedallopregnane-3,20-dione (III). The reaction is ordinarily conducted at temperatures of between ten and eighty degrees centigrade, the preferred limits being about fifteen to forty degrees centigrade. The time of the reaction may vary between one and 24 hours, with three to ten hours being preferred. Normally, under the acid conditions of the reaction, in addition to opening the oxide, the ketal groups are removed, alternatively, the ketal groups can be removed by treating the crude reaction product with an acid hydrolyzing agent, such as aqueous sulfuric acid in an organic solvent. Purification of the product is accomplished by methods known in the art such as crystallization, chromatography and the like.

The fluorohydrin (III) thus obtained can be dehydrated either directly or it can be first esterified. The esterification involves the conversion of the 21-hydroxy group to a 21-acyloxy group to produce the corresponding $5\alpha$-hydroxy-$6\beta$-fluoro-11 - oxygenated - 21 - acyloxyallopregnane-3,20-dione. This reaction can be performed under esterification conditions, e. g., by the reaction with the selected acid anhydride or acid chloride or bromide of an aliphatic hydrocarbon carboxylic acid, or by reaction with the selected acid, in the presence of an esterification catalyst or with an ester under ester exchange reaction conditions. Compounds thus produced include the compounds represented by Formula III wherein R' is hydroxy or keto, and R" is the acyl radical of an organic carboxylic acid, preferably a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, $\alpha$-ethylisovaleric, succinic, a cyclic acid, e. g., cyclopropylideneacetic, cyclopentylformic, cyclopentylacetic, $\beta$-cyclohexylpropionic, cyclohexylformic, cyclohexylacetic, an aryl or alkaryl acid, e. g., benzoic, 2-, 3-, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, $\alpha$-naphthoic, 3-methyl-$\alpha$-naphthoic, an aralkyl acid, e. g., phenylacetic, phenyl-propionic, diphenylacetic, triphenylacetic, an unsaturated acid, e. g., acrylic, maleic, vinyl acetic, propiolic, undecolic, etc.

The halohydrin, 11-oxygenated-$5\alpha,21$-dihydroxy-$6\beta$-fluoroallopregnane-3,20-dione or 21-esters thereof, is thereupon dehydrated. Dehydration can be effected in alkali solution or in acidic solution. Suitable acid dehydrating agents include mineral acids, such as, for example, hydrochloric acid and sulfuric acid. Acetic anhydride, acetic acid, p-toluenesulfonic acid, or thionyl chloride in pyridine are also suitable as dehydrating agents. Basic dehydrating agents include, for example, alkali metal hydroxides such as sodium, potassium, barium, calcium hydroxides, and the like. In the preferred embodiment of the present invention, acid dehydration is preferred. For this purpose, the steroid is dissolved in chloroform, methylene chloride, ethanol, dioxane, or other convenient solvents, with chloroform being the preferred solvent, and is treated with a mineral acid. Preferably, the solution containing the steriod is saturated with hydrogen chloride. The acidic mixture is then allowed to stand for a period of from a few minutes to four hours at a temperature between minus fifteen and plus twenty degrees centigrade to give 11-oxygenated 6-fluoro-21-hydroxy-4-pregnene-3,20-dione or the 21-esters thereof. To isolate this 6-fluoro steriod, the reaction mixture is washed with water and the solvent is evaporated. In the event the reaction is conducted in a water-miscible solvent, the reaction mixture is diluted with water and extracted with a water-immiscible solvent which is washed and evaporated to dryness. The resulting residue is purified by crystallization from a suitable organic solvent or by chromatography to produce 11-oxygenated 6-fluoro-21-hydroxy-4-pregnene-3,20-dione or the 21-esters thereof.

As previously stated, the esterification and dehydration reactions of the present invention may, if desired, be reversed, i. e., the dehydration reaction performed first. If acetic anhydride is employed as the dehydrating agent, the esterification and dehydration reaction will occur concomitantly.

Compounds represented by Formula IV can be utilized either as the free 21-alcohols or as the 21-esters. If the alcohols are desired, they are obtained from the acetates by hydrolysis in accordance with known methods for hydrolyzing Compound F 21-esters to the free Compound F alcohol. A preferred procedure is to employ at least a molar equivalent of an alkali metal bicarbonate in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete, the reaction mixture is neutralized with an acid, e. g., acetic acid, and the hydrolyzed product recovered from the reaction mixture by evaporation and crystallization, extraction with methylene chloride, or the like. The 21-esters, when desired, can be prepared by esterification of the 21-hydroxyl groups by esterification procedures hereinbefore described. The preferred 21-esters are those derived from an organic carboxylic acid, preferably a hydrocarbon carboxylic acid containing from one to twelve carbon atoms, inclusive.

The 6-fluoro compounds (IV) of the present invention contain either an 11-hydroxyl or an 11-ketone. The 11-hydroxy compounds can be oxidized to the corresponding 11-keto compounds, i. e., 6-fluoro-21-acyloxy-4-pregnene-3,11,20-trione, with an oxidizing agent. Oxidizing agents such as chromic acid, potassium dichromate, a haloamide, and the like are operative. The oxidation is generally carried out by a variety of methods, such as, for example, by oxidizing the said 6-fluoro steroid in acetic acid solution with chromium trioxide, using molar quantities or a slight excess of oxidizing agent, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the oxidant is generally destroyed by addition of methyl alcohol, ethyl alcohol, and the like for the chromic acid oxidant or a bisulfite for N-bromoacetamide, N-bromosuccinimide and other N-halo acyl amides and imides. Thereafter, the resulting 6-fluoro-21-acyloxy-4-pregnene-3,11-trione is recovered by conventional means, such as by dilution with water and extraction with water-immiscible solvents, e. g., methylene chloride, ether, benzene, toluene, or the like.

The compounds represented by Formula IV, in addition to possessing the valuable anti-rheumatoid arthritic, anti-inflammatory and glucocorticoid activity heretofore mentioned, are also useful as intermediates for the preparation of the 1-dehydro analogues thereof, namely 6-fluoro-11,21 - dihydroxy - 1,4 - pregnadiene - 3,20 - dione, 6-fluoro - 21 - hydroxy - 1,4 - pregnadiene - 3,11,20 - trione including the 21-esters thereof; the 9α-halo analogues, namely 9α - halo - 6 - fluoro - 21 - hydroxy - 4 - pregnene-3,11,20 - trione, 9α - halo - 6 - fluoro - 11β,21 - dihydroxy - 4 - pregnene - 3,20 - dione, including the 21-esters thereof; and the 1-dehydro-9α-halo analogues, namely 9α - halo - 6 - fluoro - 21 - hydroxy - 1,4 - pregnadiene - 3,11,20 - trione, and 9α - halo - 7 - fluoro-11α,21 - dihydroxy - 1,4 - pregnadiene - 3,20 - dione including the 21-esters thereof. These 9α-halo, 1-dehydro and 1-dehydro-9α-halo compounds also possess the valuable anti-rheumatoid arthritic, anti-inflammatory and glucocorticoid activity of the parent 6-fluoro compounds usually in higher degree. They possess a combination of high anti-inflammatory and glucocorticoid properties and at the same time possess low mineralocorticoid activity.

In the preparation of these compounds, 6-fluorocorticosterone or the 21-ester thereof of Formula IV can be microbiologically dehydrogenated with Septomyxa affinis, A. T. C. C. 6337, to give 6-fluoro-11β,21-dihydroxy-1,4-pregnadiene-3,20-dione or its 21-ester. The 1-dehydro-21-hydroxy compound can be acetaylated with acetic anhydride in pyridine and the acetate then dehydrated with N-bromoacetamide and anhydrous sulfur dioxide until a negative acidified potassium iodide-starch test of the reaction mixture is obtained. Dilution with cold water results in the precipitation of 6-fluoro-21-acetoxy-1,4,9(11)-pregnatriene-3,20-dione, which can be purified by recrystallization from acetone. The crystalline product can then be allowed to react in methylene chloride-tertiary butyl alcohol solution with perchloric acid and N-bromoacetamide or N-iodosuccinimide to produce a reaction mixture from which 6-fluoro-9α-bromo-11β-hydroxy-21-acetoxy-1,4-pregnadiene-3,20-dione or the corresponding 6-fluoro-9α-iodo compound, respectively, can be recovered by precipitation with ice water and recrystallization from acetone. The latter compounds can be treated in acetone solution with anhydrous potassium acetate at reflux temperature to produce 6-fluoro-9β,11β-oxido-21-acetoxy - 1,4 - pregnadiene - 3,20 - dione which is recoverable from the reaction mixture by chromatographic methods and can be purified by recrystallization from a Skellysolve B hexane hydrocarbons-acetone mixture. Reaction of the latter in methylene chloride solution with aqueous hydrogen fluoride at room temperature or with anhydrous hydrogen fluoride at lower temperatures, e. g., minus twenty to plus twenty degrees centigrade, is productive of 9α,6-difluoro - 11β - hydroxy - 21 - acetoxy - 1,4 - pregnadiene-3,20-dione. Substitution of hydrogen chloride above is productive of 9α-chloro-6-fluoro-11β-hydroxy-21-acetoxy-1,4-pregnadiene-3,20-dione.

Substitution of 6-fluorocorticosterone acetate and omission of the dehydrogenation step in the foregoing process is productive of the corresponding intermediate products, i. e., those possessing the 3-keto-Δ⁴-structure instead of the 3-keto-Δ¹,⁴-structure, and produces as end products 9α,6-difluoro - 11β - hydroxy - 21 - acetoxy - 4 - pregnene-3,20-dione and the corresponding 9α-chloro compound, respectively. These compounds can be converted to the 1-dehydro analogues at any stage of the process by fermentative 1-dehydrogenation with Septomyxa affinis.

The 9α,7 - difluoro - 11β - hydroxy - 21 - acetoxy - 1,4-pregnadiene-3,20-dione or the 9α-chloro analogue thereof can be oxidized with chromic acid in accordance with known methods for converting Kendall's Compound F 21-esters to Kendall's Compound E 21-esters to produce 9α,6-difluoro - 21 - acetoxy - 1,4 - pregnadiene - 3,11,20 - trione and 9α - chloro - 6 - fluoro - 21 - acetoxy - 1,4 - pregnadiene-3,11,20-trione, respectively. In a similar manner, the above compounds possessing the 3-keto-Δ⁴-structure can be oxidized with chromic acid to produce 9α,6-difluoro - 21 - acetoxy - 4 - pregnene - 3,11,20 - trione and 9α - chloro - 6 - fluoro - 21 - acetoxy - 4 - pregnene-3,11,20-trione, respectively.

In the acylation step of the above sequence of reactions, acetic anhydride was utilized illustratively to produce the 21-acetate of 6-fluorocorticosterone. In the same manner other acylating agents can be used to esterify 6-fluorocorticosterone to produce the corresponding 21-ester. Preferred esters are those wherein the acyl radical is that of an organic carboxylic acid, preferably a hydrocarbon carboxylic acid containing from one to twelve carbon atoms, inclusive. The ester group of any selected 21-acyloxy starting material will remain throughout the sequence of reactions as illustrated with regard to the acetate, being thus productive of the selected 21-acylate intermediate compounds corresponding to the 21-acetoxy intermediates shown.

The foregoing dihalo, 1-dehydro and 1-dehydro-dihalo compounds can be hydrolyzed to the corresponding 21-hydroxy compounds according to known methods for hydrolyzing Compound F 21-acetate to Compound F, for example, in aqueous solution with potassium bicarbonate under oxygen-free conditions. The free 21-hydroxy compounds can be re-esterified to produce the corresponding 21-acyloxy compounds, using an esterifying agent, e. g., the anhydride or acid halide of an organic carboxylic acid containing from one to twelve carbon atoms, inclusive.

The foregoing compounds represented by Formula IV, their 9α-halo, 1-dehydro and 1-dehydro-9α-halo analogues, all characterized by the presence of a 6-fluoro substituent, can exist in either the 6α- or the 6β-epimeric form. The above process produces a mixture in which both the 6β- and 6α-forms are present. The 6α-epimer can be separated from the products by chromatographic or fractional crystallization techniques known in the art. The compounds are useful, however, as such in the mixture as produced directly from the synthesis steps described. It is occasionally desirable, nevertheless, to recover the individual epimers by separation or by epimerizing the 6α-epimer. Conversion of the 6β-epimer or mixtures predominating therein can be accomplished by treatment at temperatures of zero degrees centigrade or slightly below in an organic solvent, such as chloroform, methylene chloride, ether, and the like, and in the presence of a protoropic agent (proton-donating reagent) such as water, alcohols, organic acids, and the like, with a mineral acid, such as hydrochloric acid. The mixture should be maintained at temperatures below zero degrees centigrade, or at least below room temperature, during the addition of the acid. The reaction mixture can then be washed with successive portions of dilute alkali and water, and then dried and evaporated under reduced pressure. The 6α-fluoro products can be recovered from the crude reaction product and purified by recrystallization.

Alternatively, the epimerization can be accomplished with alkali. Bases, for example, solutions of sodium hydroxide and potassium hydroxide, may be used to treat the 6β-epimer in solution in an organic solvent, such as methanol, to produce the 6α-epimer.

The following examples are illustrative of the process and products of the present invention, but are not to be construed as limiting.

EXAMPLE 1

*11-dehydrocorticosterone 3,20-bis-(ethylene ketal)*

A solution was prepared containing fifty grams of 11-dehydrocorticosterone, five grams of para-toluenesulfonic acid in 2.5 liters of benzene and 125 milliliters of ethylene glycol. This solution was refluxed vigorously with rapid stirring for 5.5 hours using a water trap to remove the water formed in the reaction. After this period the solution was cooled and the benzene layer was separated and washed with fresh ethylene glycol. The benzene solution, containing the 11-dehydrocorticosterone 3,20-bis-(ethylene ketal), was used in Example 3 without any further purification or isolation. If desired, the crystalline bis-ketal can be obtained from the benzene solution as disclosed in U. S. Patent 2,802,841.

In the same manner as shown above and as disclosed in U. S. Patent 2,802,841, treating 11-dehydrocorticosterone with alkanediols containing up to and including eight carbon atoms in the presence of benzene and paratoluene-sulfonic acid is productive of the corresponding 11-dehydrocorticosterone, 3,20-bis(alkylene ketal). The alkanediols used are preferably vicinal alkanediols such as alkane-1,2-diols, or the alkane-1,3-diols, such as, for example, ethylene glycol, propane-1,2-diol, propane-1,3-diol, butane-1,2-diol, butane-2,3-diol, pentane-1,2-diol, 3-methylpentane-1,2-diol, hexane-1,3-diol, octane-1,2-diol, and the like.

EXAMPLE 2

Corticosterone 3,20-bis-(ethylene ketal)

In the same manner shown in Example 1, treating corticosterone in benzene with ethylene blycol and para-toluenesulfonic acid is productive of corticosterone 3,20-bis-(ethylene ketal). Similarly, substituting for ethylene glycol alkanediols containing up to and including eight carbon atoms, as illustrated in Example 1, is productive of the corresponding corticosterone 3,20-bis-(alkylene ketals).

Alternatively, corticosterone 3,20-bis-(alkylene ketal) is produced from 11-dehydrocorticosterone 3,20-bis-(alkylene ketal) by treatment with lithium aluminum hydride as disclosed in U. S. Patent 2,802,841.

EXAMPLE 3

5α,6α-oxido-21-hydroxyallopregnane-3,11,20-trione 3,20-bis-(ethylene ketal)

The benzene solution of 11-dehydrocorticosterone 3,20-bis-(ethylene ketal) from Example 1 was cooled to five degrees centigrade and twenty grams of anhydrous sodium acetate followed by 200 milliliters of forty percent peracetic acid was added thereto. The heterogeneous mixture was stirred vigorously for two and one half hours at this temperature and was then neutralized with twenty percent sodium hydroxide. Then the mixture was washed with water, dilute sodium thiosulfate solution, dried with magnesium sulfate, filtered, and concentrated to about 225 milliliters to cause crystallization of the product. The yield of 5α,6α-oxido-21-hydroxyallopregnane-3,20-dione 3,20-bis-(ethylene ketal) was 12.3 grams of melting point 217 to 225 degrees centigrade. An additional six grams was obtained by chromatography of the mother liquor. An analytical sample, recrystallized from acetone, had a melting point of 225 to 229 degrees centigrade and a rotation of $[\alpha]_D$ minus two degrees (chloroform).

Analysis.—Calculated for $C_{25}H_{36}O_7$: C, 66.94; H, 8.09. Found: C, 67.01; H, 8.21.

EXAMPLE 4

5α,6α-oxido-11β,21-dihydroxyallopregnane-3,20-dione 3,20-bis-(ethylene ketal)

In the same manner as shown in Example 3, treating corticosterone 3,20-bis-(ethylene ketal) in benzene solution with peracetic acid and sodium acetate is productive of 5α,6α-oxido-11β,21-dihydroxyallopregnane-3,20-dione 3,20-bis-(ethylene ketal).

EXAMPLE 5

5α,21-dihydroxy-6β-fluoroallopregnane-3,11,20-trione

To a solution of five grams of 5α,6α-oxido-21-hydroxyallopregnane-3,11,20-trione 3,20-bis-(ethylene ketal) in 100 milliliters of methylene chloride was added five milliliters of 48 percent hydrofluoric acid. The heterogeneous mixture was stirred for five and one-half hours and was then washed with water, dried, and evaporated to dryness. The residue was dissolved in fifty milliliters of methanol and two milliliters of 1 Normal sulfuric acid added thereto. The solution was boiled for twenty minutes and was then cooled, diluted with water, and extracted with methylene chloride. The methylene chloride extract was washed with water, dried and chromatographed over 160 grams of synthetic magnesium silicate. The fraction eluted with 25 and 35 percent acetone in Skellysolve B hexanes contained 1.1 grams of 5α,21-dihydroxy-6β-fluoroallopregnane-3,11,20-trione. This was used in Example 7 without further purification.

EXAMPLE 6

5α,11β,21-trihydroxy-6β-fluoroallopregnane-3,20-dione

In the same manner as shown in Example 5, treating 5α,6α - oxido - 11β,21 - dihydroxyallopregnane - 3,20 - dione 3,20-bis-(ethylene ketal) with hydrofluoric acid is productive of 5α,11β,21-trihydroxy-6β-fluoroallopregnane-3,20-dione.

EXAMPLE 7

5α,21-dihydroxy-6β-fluoroallopregnane-3,11,20-trione 21-acetate

A solution of 1.1 grams of 5α,21-dihydroxy-6β-fluoroallopregnane-3,11,20-trione (from Example 5) in two milliliters of pyridine and three milliliters of acetic anhydride was allowed to stand at room temperature for eighteen hours and the solvent was then evaporated under a stream of nitrogen. The residue was dissolved in methylene chloride and was chromatographed over 100 grams of synthetic magnesium silicate. The fraction eluted with fourteen percent acetone in Skellysolve B hexanes was crystallized from acetone-Skellysolve B hexanes to give 300 milligrams of 5α,21-dihydroxy-6β-fluoroallopregnane-3,11,20-trione-21-acetate of melting point 222 to 228 degrees centigrade and having a rotation of $[\alpha]_D$ plus 95 degrees (chloroform).

Analysis.—Calculated for $C_{23}H_{31}FO_6$: C, 65.38; H, 7.40; F, 4.50. Found: C, 64.97; H, 7.57; F, 4.34.

Following the procedure described above but substituting 5α,11β,21-trihydroxy-6β-fluoroallopregnane 3,20-dione from Example 6 as starting material therein is productive of the corresponding 21-acetate.

In the same manner as shown in Example 7 above, esterification of 5α,21-dihydroxy-6β-fluoroallopregnane-3,11,20-trione or of 5α,11β,21-trihydroxy-6β-fluoroallopregnane-3,20-dione with other esterifying agents is productive of the corresponding 21-ester. The preferred 21-esters are those wherein the acyl radical is that of an organic carboxylic acid, preferably a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric succinic, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-,3-, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, an unsaturated acid, e. g., acrylic, maleic, vinyl acetic, propiolic, undecolic, etc.

EXAMPLE 8

6α-fluoro-21-hydroxy-4-pregnene-3,11,20-trione 21-acetate (6α-fluoro-11-dehydrocorticosterone 21-acetate)

A solution of 300 milligrams of 5α,21-dihydroxy-6β-fluoroallopregnane-3,11,20-trione 21-acetate in ten milliliters of chloroform and 0.5 milliliters of absolute ethanol was cooled in an ice-salt bath and was saturated with hydrogen chloride gas. After standing at this temperature for two hours nitrogen was bubbled through the solution to remove excess hydrogen chloride. The solution was washed with water, dilute sodium bicarbonate solution, and again with water, and was then dried and evaporated to dryness. The residue was crystallized from acetone-Skellysolve B hexanes to give 130 milligrams of 6α-fluoro-11-dehydrocorticosterone 21-acetate having a melting point of 202 to 204 degrees centigrade and a rotation of [α]$_D$ plus 222 degrees (chloroform).

*Analysis.*—Calculated for $C_{23}H_{29}FO_5$: C, 68.30; H, 7.23; F, 4.70. Found: C, 67.94; H, 7.45; F, 3.97.

EXAMPLE 9

*6β-fluoro-21-hydroxy-4-pregnene-3,11,20-trione 21-acetate (6β-fluoro-11-dehydrocorticosterone 21-acetate)*

A solution of 0.5 gram of 5α,21-dihydroxy-6β-fluoroallopregnane-3,11,20-trione 21-acetate in fifteen milliliters of chloroform was cooled in an ice-salt bath and was saturated with hydrogen chloride gas. After standing at this temperature for two hours nitrogen was bubbled through the solution to remove excess hydrogen chloride. The solution was washed with dilute sodium bicarbonate solution and water, and was then dried and evaporated to dryness. The residue was a mixture of 6β-fluoro-11-dehydrocorticosterone 21-acetate and 6α-fluoro-11-dehydrocorticosterone 21-acetate, which were separated by chromatography and recrystallization from ethyl acetate.

Following the procedure of Examples 8 and 9 and substituting 5α,21-dihydroxy-6β-fluoroallopregnene-3,11,20-trione, 5α,11β,21-trihydroxy-6β-fluoroallopregnane-3,20-dione, or 5α,11β,21-trihydroxy-6β-fluoroallopregnane-3,20-dione-21-acetate as starting material is productive of the corresponding 6-fluoro compounds, i. e., 6α-fluoro-11-dehydrocorticosterone, 6β-fluoro-11-dehydrocorticosterone, 6α-fluorocorticosterone, 6β-fluorocorticosterone, 6α-fluorocorticosterone 21-acetate, and 6β-fluorocorticosterone 21-acetate.

EXAMPLE 10

*6α-and 6β-fluoro-11-dehydrocorticosterone 21-acetate*

Oxidation of 6α-fluorocorticosterone 21-acetate and 6β-fluorocorticosterone 21-acetate of Example 9 with chromic acid in acetic acid gave 6α-fluoro-11-dehydrocorticosterone 21-acetate and 6β-fluoro-11-dehydrocorticosterone 21-acetate, respectively.

EXAMPLE 11

*6α-fluoro-11-dehydrocorticosterone*

A solution of 1.1 grams of 6α-fluoro-11-dehydrocorticosterone 21-acetate, 1.0 gram of potassium bicarbonate, 100 milliliters of methanol and fifteen milliliters of water was purged with nitrogen and stirred at 25 degrees centigrade for five hours. The solution was then neutralized by the addition of acetic acid and the methanol was removed under reduced pressure. The residue was extracted with 100 milliliters of methylene chloride and the extract was dried and purified by chromatography to give 6α-fluoro-11-dehydrocorticosterone.

In the same manner as described above, saponification of 6β-fluoro-11-dehydrocorticosterone 21-acetate, 6α-fluorocorticosterone 21-acetate, and 6β-fluorocorticosterone 21-acetate is productive of the corresponding 21-hydroxy compounds.

EXAMPLE 12

*6α-fluoro-11-dehydrocorticosterone 21-acetate*

Acetylation of 6α-fluoro-11-dehydrocorticosterone with acetic anhydride and pyridine according to the procedure of Example 7 is productive of 6α-fluoro-11-dehydrocorticosterone 21-acetate.

Similarly other 21-organic carboxylic acid esters of the 21-hydroxy compounds of Example 9 are prepared by contacting such 21-hydroxy compounds with an appropriate acylating agent, e. g., the anhydride or acid halide of the selected acid in a solvent such as, for example, pyridine. The preferred 21-acylate compounds thus produced are those wherein the acyl radical is selected from those enumerated in Example 7.

EXAMPLE 13

*Isomerization of 6β- to 6α-flluoro-11-dehydrocorticosterone 21-acetate*

A solution of 0.150 gram of 6β-fluoro-11-dehydrocorticosterone 21-acetate of Example 9 in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then washed with dilute sodium bicarbonate and water, dried over anhydrous sodium sulfate, and evaporated to dryness under reduced pressure. Crystallization of the residue from acetone-Skellysolve B gave 6α-fluoro-11-dehydrocorticosterone 21-acetate, of Example 8.

In a similar manner, 6β-fluoro-11-dehydrocorticosterone, 6β-fluorocorticosterone, and 6β-fluorocorticosterone 21-acetate are converted to the corresponding 6α-fluoro compounds.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 6-fluoro-11-oxygenated-21-hydroxy-4-pregnene-3,20-dione of the formula:

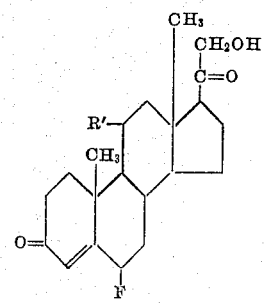

wherein R′ is a member of the group consisting of hydroxy and keto; and the 21-acylates thereof wherein the acyl radical is that of a hydrocarbon carboxylic acid containing from one to twelve carbon atoms, inclusive.

2. 6-fluorocorticosterone and the 21-acylates thereof wherein the acyl radical is that of a hydrocarbon carboxylic acid containing from one to twelve carbon atoms, inclusive.

3. 6-fluorocorticosterone.
4. 6α-fluorocorticosterone.
5. 6β-fluorocorticosterone.
6. 6-fluorocorticosterone 21-acetate.
7. 6α-fluorocorticosterone 21-acetate.
8. 6β-fluorocorticosterone 21-acetate.
9. 6-fluoro-11-dehydrocorticosterone and the 21-acylates thereof wherein the acyl radical is that of a hydrocarbon carboxylic acid containing from one to twelve carbon atoms, inclusive.
10. 6-fluoro-11-dehydrocorticosterone.
11. 6α-fluoro-11-dehydrocorticosterone.
12. 6β-fluoro-11-dehydrocorticosterone.
13. 6-fluoro-11-dehydrocorticosterone 21-acetate.
14. 6α-fluoro-11-dehydrocorticosterone 21-acetate.
15. 6β-fluoro-11-dehydrocorticosterone 21-acetate.

16. 5α,21-dihydroxy-6β-fluoro - 11 - oxygenated - allopregnane-3,20-dione of the formula:

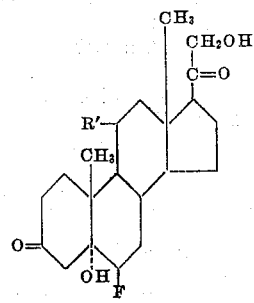

wherein R' is a member of the group consisting of hydroxy and keto; and the 21-acylates thereof wherein the acyl radical is that of a hydrocarbon carboxylic acid containing from one to twelve carbon atoms, inclusive.

17. 15α,21-dihydroxy - 6β - fluoroallopregnane - 3,11,20-trione.

18. 5α,21-dihydroxy - 6β - fluoroallopregnane - 3,11,20-trione 21-acetate.

19. 5α,11β,21-trihydroxy-6β-fluoroallopregnane - 3,20-done.

20. 5α,11β,21-trihydroxy-6β-fluoroallopregnane - 3,20-done 21-acetate.

No references cited.

UNITED STATES PATENT OFFICE
Certificate of Correction

Patent No. 2,838,540                                                                 June 10, 1958

J Allan Campbell et al.

It is hereby certified that error appears in the printed specification of the above numbered patent requiring correction and that the said Letters Patent should read as corrected below.

Column 1, line 29, and lines 30 and 31, for "-fluoroallopregnene-" each occurrence, read *-fluoroallopregnane-*; column 4, line 75, for "-3,11-trione" read *-3,11,20-trione*; column 5, line 17, for "9α-halo-7-fluoro-" read *9α-halo-6-fluoro-*; line 72, for "9α,7-difluoro-" read *9α,6-difluoro-*.

Signed and sealed this 3rd day of March 1959.

[SEAL]

Attest:
KARL H. AXLINE,
*Attesting Officer.*

ROBERT C. WATSON,
*Commissioner of Patents.*